United States Patent [19]
Lienhart et al.

[11] Patent Number: 5,462,190
[45] Date of Patent: Oct. 31, 1995

[54] FUEL CAP TETHER APPARATUS

[75] Inventors: Shelly L. Lienhart; Roger J. Rademacher, both of Holt, Mich.

[73] Assignee: General Motors Corporation, Detroit, Mich.

[21] Appl. No.: 376,251

[22] Filed: Jan. 23, 1995

[51] Int. Cl.⁶ ................................................. B65D 55/16
[52] U.S. Cl. .................. 220/375; 220/379; 220/DIG. 33; 296/97.22
[58] Field of Search ................................. 220/212, 212.5, 220/375, 379, 744, 86.2, DIG. 33; 215/306; 296/97.22; 224/273, 42.46 R

[56] References Cited

U.S. PATENT DOCUMENTS

| | | | |
|---|---|---|---|
| 1,518,467 | 12/1924 | Van Pelt . | |
| 4,320,853 | 3/1992 | Moore | 220/375 |
| 4,653,711 | 3/1987 | Marshell . | |
| 4,705,190 | 11/1987 | Mizusawa | 220/375 |
| 4,746,089 | 5/1988 | Clapper . | |
| 4,756,491 | 7/1988 | Abraham . | |
| 4,776,486 | 10/1988 | Mizusawa . | |
| 4,811,765 | 3/1989 | Giha . | |
| 4,867,337 | 9/1989 | Eichenseer | 220/375 |
| 4,957,266 | 9/1990 | Ellis . | |
| 4,958,745 | 9/1990 | Masuda et al. | 220/375 |
| 5,118,019 | 6/1992 | Harrison . | |
| 5,150,808 | 9/1992 | Hamilton | 220/375 |

FOREIGN PATENT DOCUMENTS 2400757   7/1975   Germany ............................ 296/97.22

*Primary Examiner*—Allan N. Shoap
*Assistant Examiner*—Stephen Cronin
*Attorney, Agent, or Firm*—Saul Schwartz

[57] ABSTRACT

A fuel cap tether apparatus on a motor vehicle having a body panel with an access opening or port therein, a fuel tube including a neck behind the access opening, a fuel door mounted on the vehicle for pivotal movement between open and closed positions exposing and concealing, respectively, the access opening, and a fuel cap closing the fuel tube neck and removable therefrom in response to twisting of the fuel cap relative to the fuel tube neck. The fuel cap tether apparatus includes a string-like flexible tether having a first end rigidly connected to the vehicle and a second end connected to the fuel cap such that the latter is rotatable relative to the tether and a hook on the fuel door disposed laterally outboard of the body panel surrounding the fuel tube access opening when the fuel door is in its open position. After the fuel cap is removed, the tether is hung in the hook and the fuel cap released. Under the influence of gravity, the fuel cap is suspended by the tether vertically below the hook and correspondingly laterally outboard of the body panel.

3 Claims, 2 Drawing Sheets

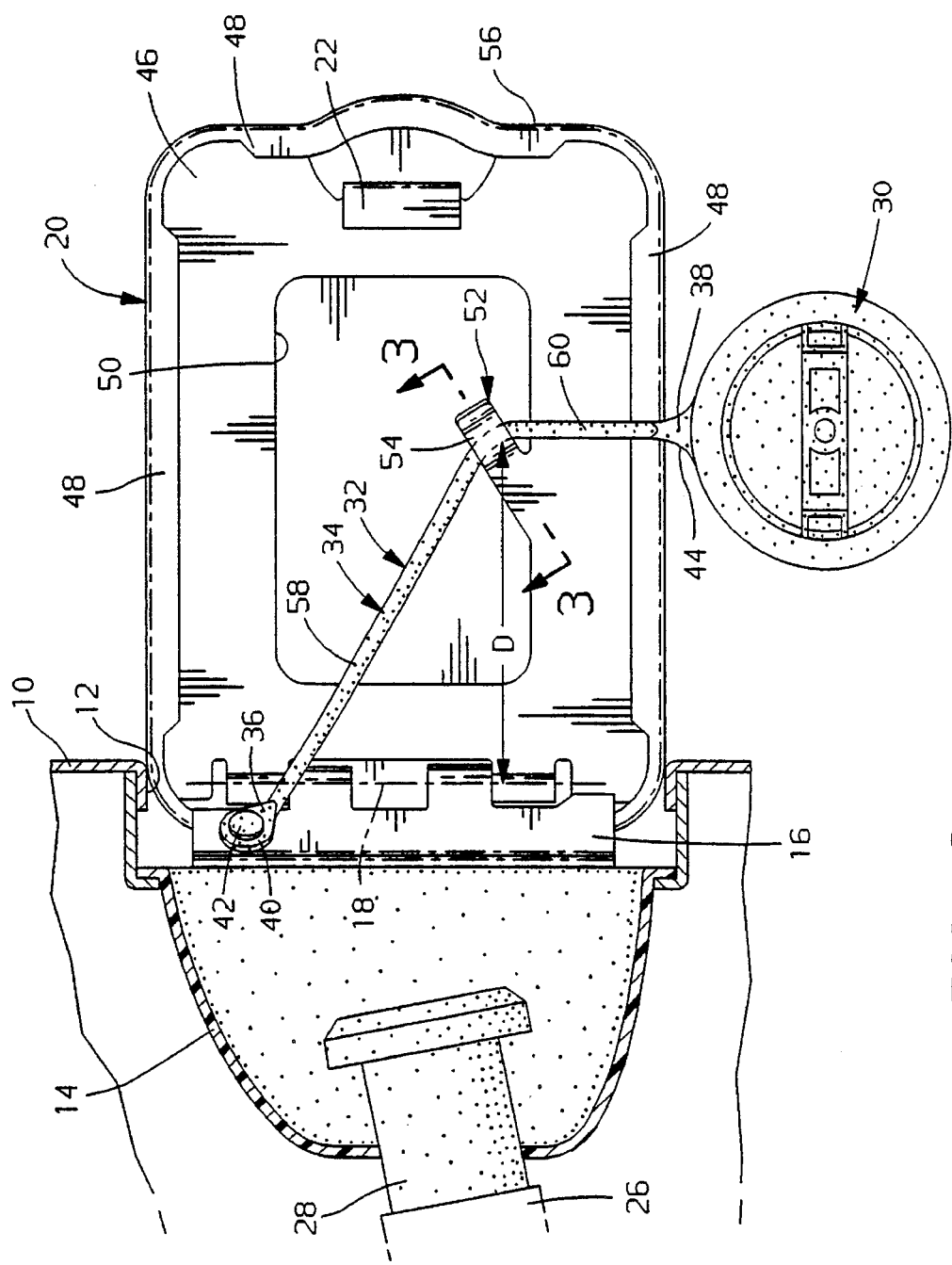

5,462,190

FUEL CAP TETHER APPARATUS

FIELD OF THE INVENTION

This invention relates to a motor vehicle fuel cap tether apparatus.

BACKGROUND OF THE INVENTION

In most motor vehicles, a neck or outer end of a fuel tube is accessible through an opening or port in a body panel of the vehicle and is closed by a fuel cap which is twisted or rotated relative to the neck for removal. A fuel door is mounted on the body for pivotal movement between open and closed positions exposing and concealing, respectively, the fuel tube opening in the body panel. Commonly, the fuel cap is attached to the neck or to the vehicle by a flexible tether to minimize the likelihood that the fuel cap will be lost or not replaced. To prevent a tethered fuel cap from striking the body panel during refueling, a prior fuel cap tether apparatus includes a flexible tether attached to the fuel tube neck which unfolds when the fuel cap is removed to a selfsustaining extended position suspending the fuel cap away from the surrounding body panel. Over time, however, the tether may assume a permanent fold corresponding to the position of the tether when the fuel cap is on the fuel tube neck. Other proposals include a tether consisting of rigid, folding links between the fuel cap and the fuel tube neck, a magnet for temporarily affixing the fuel cap to the fuel door, and a rack on the fuel door in which the fuel cap is stored during refueling.

SUMMARY OF THE INVENTION

This invention is a new and improved fuel cap tether apparatus on a motor vehicle having a body panel with an access opening or port therein, a fuel tube including a neck or outboard end behind or inboard of the access opening, a fuel door mounted on the vehicle for pivotal movement between open and closed positions exposing and concealing, respectively, the access opening, and a fuel cap closing the fuel tube neck and removable therefrom in response to twisting or rotation of the fuel cap relative to the fuel tube neck. The fuel cap tether apparatus according to this invention includes a string-like flexible tether having a first end rigidly connected to the vehicle and a second end connected to the fuel cap such that the latter is rotatable relative to the tether and a hook on the fuel door disposed laterally outboard of the body panel surrounding the fuel tube access opening when the fuel door is in its open position. After the fuel cap is removed, the tether is hung in the hook and the fuel cap released. Under the influence of gravity, the fuel cap is suspended by the tether vertically below the hook and correspondingly laterally outboard of the body panel. In a preferred embodiment, a lateral span dimension between the body panel and the hook is calculated to exceed the length of the tether between the second end thereof and the hook by an amount calculated to insure that the fuel cap will not strike the body panel when swung in pendulum-like fashion on the tether from the hook.

BRIEF DESCRIPTION OF THE DRAWINGS

FIG. 2 is a view taken generally along the plane indicated by lines 2—2 in FIG. 1; and FIG. 3 is a sectional view taken generally along the plane indicated by lines 3—3 in FIG. 2.

DESCRIPTION OF A PREFERRED EMBODIMENT

Figure 1:
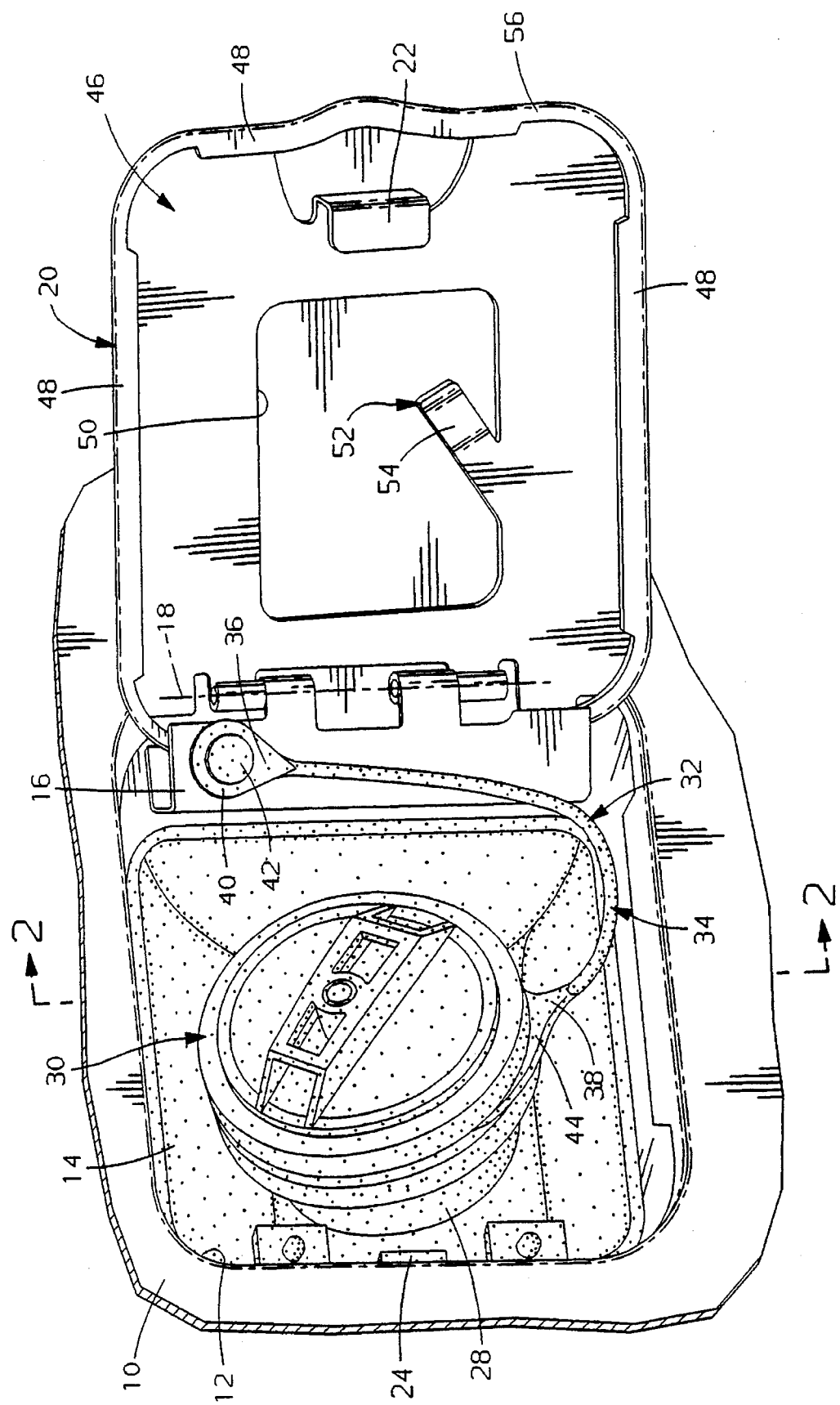
FIG. 1 is a fragmentary perspective view of a motor vehicle having a fuel cap tether apparatus according to this invention.

Referring to FIGS. 1–2, a motor vehicle, not shown, includes a representative, generally vertical body panel 10 having a fuel tube access opening 12 therein. A plastic escutcheon 14 is mounted on the vehicle behind the access opening 12. A rigid hinge support 16 on the vehicle adjacent a side edge of the access opening 12 defines a generally vertical axis 18. A fuel door 20 is connected to the hinge support 16 for pivotal movement about the axis 18 between a closed position, not shown, in which the fuel door closes the access opening 12 flush with the body panel 10 and an open position, FIGS. 1–2, substantially normal to body panel 10 exposing the access opening. A spring latch 22 on the fuel door cooperates with a keeper 24 on the escutcheon in retaining the fuel door in its closed position.

A fuel tube 26 of the motor vehicle has an inboard end, not shown, connected to a fuel tank and a neck 28 projecting through and supported on the escutcheon 14 behind the access opening 12. A fuel cap 30 closes the neck 28 and is removable therefrom by twisting or rotating the fuel cap relative to the neck. A fuel cap tether apparatus 32 according to this invention connects the fuel cap to the vehicle to prevent loss of the fuel cap during refueling.

The fuel cap tether apparatus 32 includes a string-like flexible tether 34 having a first end 36 and a second end 38. The tether 34 is referred to as string-like because it functions only in tension and has little inherent rigidity either in compression along the length of the tether or in bending perpendicular to the length of the tether. The tether has a grommet 40 at the first end 36 thereof which is rigidly connected to the hinge support 16 by a rivet 42. The tether 34 has an integral loop 44 at the second end thereof which encircles the fuel cap 30 and seats in an annular groove, not shown, in the latter whereby the cap is rotatable relative to the tether.

Referring to FIGS. 1–3, a flat plate 46 is mounted on the fuel door 20 on the side of the latter facing the escutcheon 14 when the fuel door is closed. The plate 46 is retained on the fuel door by a plurality of flanges 48 of the latter bent back over the plate. The plate 46 has a rectangular opening or window therein the boundary of which is defined by an inner edge 50 of the plate. The inner edge 50 is interrupted by an integral appendage 52 of the plate 46 projecting diagonally upward into the window in the plate. The appendage 52 is bent outward relative to the plane of the plate 46, FIG. 3, to define a hook 54 on the side of the of the fuel door facing the escutcheon about midway between the vertical axis 18 and an outboard vertical edge 56 of the fuel door. When the fuel door is in its open position, FIGS. 1–2, the hook 54 is disposed laterally outboard of the body panel 10 by a span dimension "D", FIG. 2.

When the fuel cap 30 is on the neck 28 and the fuel door 20 is in its closed position, the tether 34 is slacked within the escutcheon. For refueling, an operator pivots the fuel door to its open position and removes the fuel cap by grasping and twisting the latter relative to the fuel tube neck 28. After the fuel cap 30 is removed, the operator hangs the tether 34 on the hook 54 and releases the fuel cap. Under the influence of gravity, the fuel cap pulls the second end 38 of the tether vertically down until an inboard portion 58 of the tether 34 between the rivet 42 and the hook 54 becomes taut. When the inboard portion 58 becomes taut, the fuel cap 30 is suspended vertically below the hook 54 by an outboard portion 60 of the tether in a position laterally separated from the body panel by substantially the span dimension "D" so that the fuel cap does not rest against or strike the body panel. The hanging position of the fuel cap is also removed from the area of the fuel tube neck 28 for minimum obstruction to refueling. Preferably, the span dimension "D" exceeds the length of the outboard portion 60 of the tether 34 by an amount calculated to insure that fuel cap 30 will not strike the body panel 10 when swung in pendulum-like fashion from the hook 54 accidentally or by a wind gust. When refueling is complete, the operator lifts the tether out of the hook 54, inserts and twists the fuel cap on the neck 28 of the fill tube, and pivots the fuel door 20 back to its closed position.

The embodiments of the invention in which an exclusive property or privilege is claimed are defined as follows:

1. A fuel cap tether apparatus on a motor vehicle including a body panel having a fuel tube access opening therein, a fuel tube having a neck behind said access opening, a fuel door mounted on said vehicle for pivotal movement between a closed position closing said fuel tube access opening and an open position projecting outward from said body panel and exposing said fuel tube access opening, and a fuel cap closing said fuel tube neck and removable therefrom by rotation relative to said fuel tube, said fuel cap tether apparatus comprising:

a string-like flexible tether having a first end and a second end, means attaching said first end of said string-like flexible tether to said vehicle, means attaching said fuel cap to said string-like flexible tether at said second end thereof so that said fuel cap is rotatable relative to said string-like flexible tether, and a hook means on a side of said fuel door facing said fuel tube neck in said closed position of said fuel door separated from said body panel by a lateral span dimension when said fuel door is in said open position operative to releasably hang said string-like flexible tether on said fuel door when said fuel cap is removed from said fuel tube neck so that said fuel cap is laterally separated from said body panel when suspended vertically below said hook means by an outboard end of said string-like flexible tether defined between said hook means and said second end of said string-like flexible tether.

2. The fuel cap tether apparatus recited in claim 1 wherein said hook means includes:

a flat plate having a window therein mounted on a side of said fuel door facing said fuel tube neck in said closed position of said fuel door, and an integral appendage of said flat plate projecting into said window thereof and bent outward relative to the plane of said flat plate toward said fuel tube neck in said closed position of said fuel door to define a hook on said fuel door.

3. The fuel cap tether apparatus recited in claim 2 wherein:

said lateral span dimension exceeds the length of said outboard end of said string-like flexible tether by an amount calculated to insure that said fuel cap does not strike said body panel when swung in pendulum-like fashion from said hook on said fuel door.

* * * * *